(12) United States Patent
Kangas

(10) Patent No.: US 7,450,063 B2
(45) Date of Patent: Nov. 11, 2008

(54) METHOD AND ARRANGEMENTS RELATING TO SATELLITE-BASED POSITIONING

(75) Inventor: Ari Kangas, Lidingo (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1 day.

(21) Appl. No.: 10/598,148

(22) PCT Filed: Dec. 30, 2004

(86) PCT No.: PCT/SE2004/002050

§ 371 (c)(1),
(2), (4) Date: Aug. 18, 2006

(87) PCT Pub. No.: WO2005/081010

PCT Pub. Date: Sep. 1, 2005

(65) Prior Publication Data

US 2007/0139264 A1 Jun. 21, 2007

Related U.S. Application Data

(60) Provisional application No. 60/545,175, filed on Feb. 18, 2004.

(51) Int. Cl.
*G01S 5/14* (2006.01)

(52) U.S. Cl. .............................................. 342/357.12
(58) Field of Classification Search ............ 342/357.01, 342/357.02, 357.06, 357.12; 701/213, 215
See application file for complete search history.

(56) References Cited

U.S. PATENT DOCUMENTS

| 6,408,178 B1 | 6/2002 | Wickstrom et al. |
| 6,473,694 B1 | 10/2002 | Akopian et al. |
| 6,563,461 B1 | 5/2003 | Elgersma et al. |

*Primary Examiner*—Dao L Phan
(74) *Attorney, Agent, or Firm*—Roger S. Burleigh

(57) ABSTRACT

Alleviating ambiguous pseudorange reconstruction in connection with satellite-based positioning of mobile terminals with assistance data such as Assisted GPS (AGPS). An initial pseudorange selection cycle includes: determining a first admissible pseudorange associated with a first satellite; determining all pseudoranges associated with at least two additional satellites which combined with the first pseudorange form admissible relative pseudoranges; forming a set of pseudorange vectors representing all possible combinations of the determined pseudoranges associated with the first and at least two additional satellites; and forming a set of selected pseudorange vectors by selecting at least one vector from the set of pseudorange vectors.

33 Claims, 8 Drawing Sheets

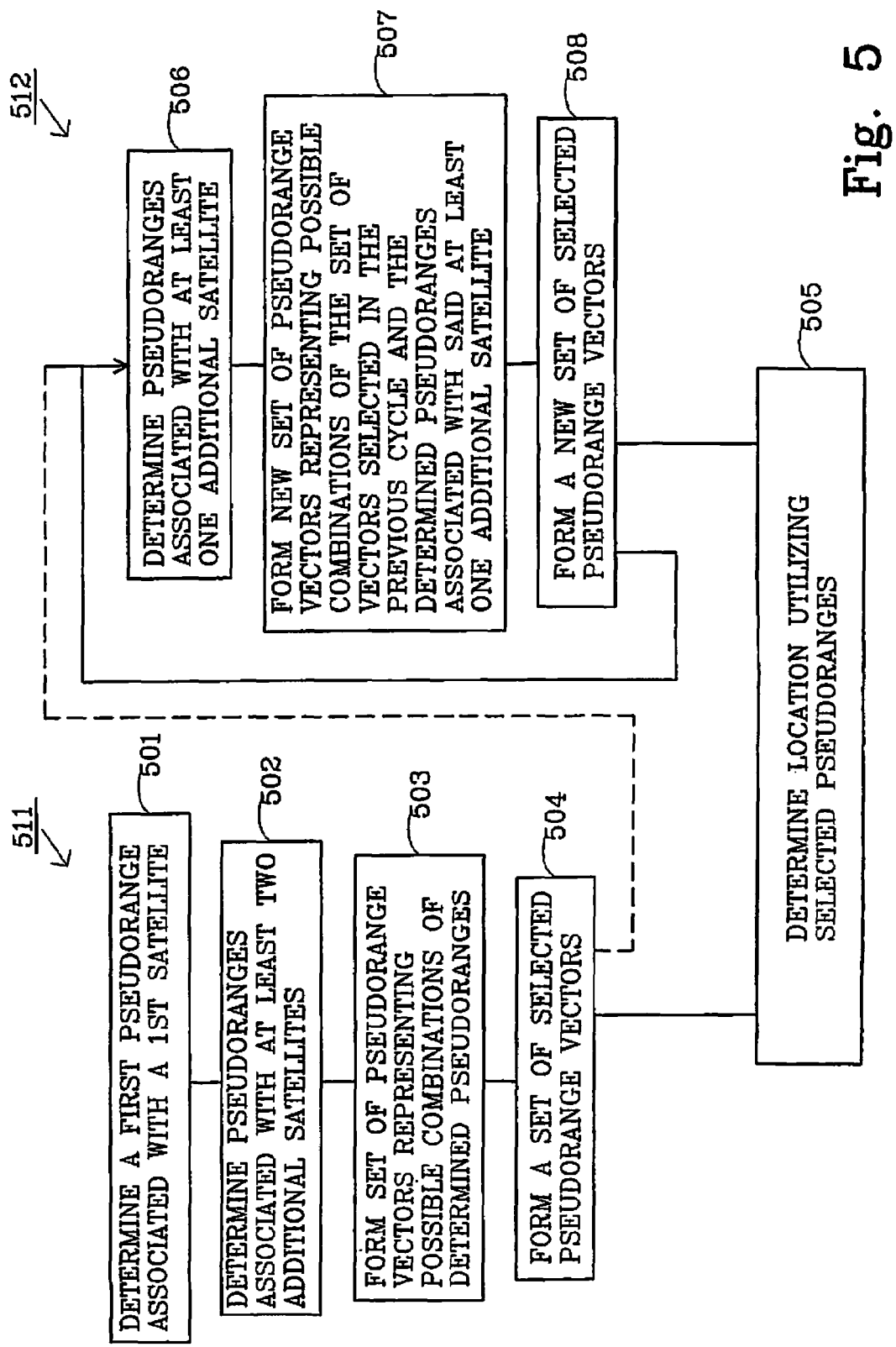

METHOD AND ARRANGEMENTS RELATING TO SATELLITE-BASED POSITIONING

TECHNICAL FIELD OF THE INVENTION

The present invention relates in general to positioning of mobile equipment by use of satellites and in particular to such positioning assisted by land based communication nodes.

DESCRIPTION OF RELATED ART

In recent years, determination of the geographic position of an object, equipment or a person carrying the equipment has become more and more interesting in many fields of application. One approach to solve the positioning is to use signals emitted from satellites to determine a position. Well-known examples of such systems are the Global Positioning System (GPS) (see e.g. [1]) and the coming GALILEO system. The position is given with respect to a specified coordinate system as a triangulation/trilateration based on a plurality of received satellite signals.

A stand-alone GPS receiver can obtain full locking to GPS satellite signals, without having any other information about the system except nominal carrier frequency and the rules by which data carried by the signals are modulated. Basically, the three-dimensional position as well as a receiver clock bias to the satellite time have to be determined in the position calculation step.

Assisted GPS (AGPS) has been defined as an enhancement of GPS (see e.g. 3rd Generation Partnership Project (3GPP) specifications TS 25.331 or TS 44.031 or Open Mobile Alliance (OMA) specifications for Secure User Plane Location (SUPL)) for integration of GPS receivers into user equipment, i.e. mobile stations, of cellular communication systems. Assisted GPS in general aims at improving the performance of GPS receivers in many different respects, including detection sensitivity, time to obtain a location estimate, accuracy and saving battery power. This is done by moving some functionality from the GPS receiver in the mobile station to the network and hence only performing a subset of the GPS tasks in the GPS receiver itself.

There are two types of AGPS, Mobile Station (or User Equipment) based and Mobile Station (or User Equipment) assisted. In Mobile Station based AGPS, the location of a mobile station is calculated in the mobile station using ranging signal measurement results determined by the mobile station together with assistance data provided by the network. In Mobile Station assisted AGPS (sometimes also referred to as Network based AGPS), the mobile station only measures and reports timing of received ranging signals reflecting the pseudoranges to the Space Vehicles (i.e. satellites). For both types of AGPS, the measured timing of the ranging signals are truncated modulo 1 ms which corresponds to a distance of 300 km. When calculating the mobile station location, either in the mobile station itself or in a network location server, the complete pseudoranges need to be reconstructed using apriori information about the mobile station location together with the ranging signal measurement results determined by the mobile station, in order to compute the precise mobile station location.

The inventor of the present invention have identified a problem with AGPS in that measuring and reporting truncated timing of received ranging signals may cause ambiguities when determining pseudoranges to space vehicles, if the precision of the apriori information about the mobile station position is too low, i.e. the uncertainty of the mobile station position in said apriori information is too large. As a result, if an incorrect pseudorange is selected and used as a basis for determining the location of the mobile station, there will be a significant error in the calculated mobile station position in the order of e.g. 100 km.

SUMMARY OF THE INVENTION

The problem dealt with by the present invention is providing increased robustness, in the context of satellite based positioning with assistance data, against ambiguous pseudorange reconstruction.

The problem is solved by a method according to claim 1, an apparatus according to claim 19 and a computer program embodied on a computer-readable medium according to claim 33.

An advantage afforded by the invention is increased robustness against ambiguous pseudorange reconstruction in connection with satellite based positioning with assistance data such as Assisted GPS (AGPS).

Another advantage of the invention is that the increased robustness is achieved without reducing the detection sensitivity.

Yet another advantage of the invention is that the increased robustness is achieved with an insignificant increase in processing delays.

The invention will now be described in more detail with reference to exemplary embodiments thereof and also with reference to the accompanying drawings.

BRIEF DESCRIPTION OF THE DRAWINGS

FIG. 5 is a flow diagram illustrating a basic method according to the invention.

DETAILED DESCRIPTION OF THE EMBODIMENTS

Figure 1:
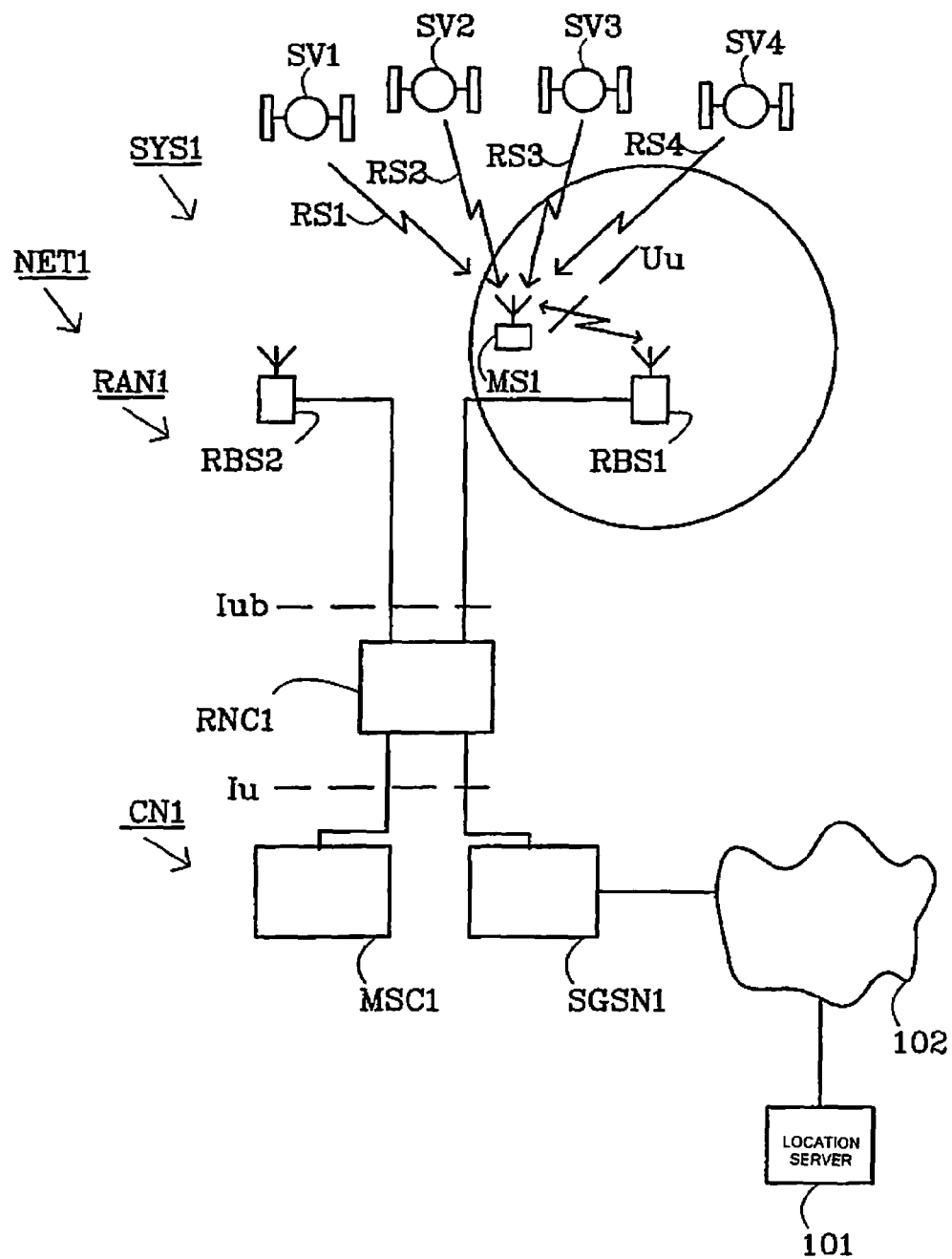
FIG. 1 is a schematic view of an example scenario of Mobile Station assisted AGPS in which the present invention is applied

FIG. 1 illustrates a non-limiting example scenario in which the present invention may be applied. In this example scenario a basic wireless communication system SYS1 together with the Global Positioning System (GPS) is used to provide Mobile Station assisted AGPS. The example wireless communication system SYS1 illustrated in FIG. 1 is a Universal Mobile Telecommunication System (UMTS). The communication system SYS1 includes a network part NET1 and User Equipment (UE), alternatively referred to as mobile stations (MS). The network part NET1 comprises a core network CN1 and a UMTS Terrestrial Radio Access Network (UTRAN) RAN1. The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile station MS1 shown in FIG. 1, communicate with one or more radio base stations RBS1-RBS2 over a radio or air interface referred to as the Uu interface. Each of the radio interface Uu, the Iu interface and the Iub interface are shown by dashed lines in FIG. 1.

In FIG. 1, the GPS system is represented by Space Vehicles, i.e. satellites, SV1-SV4. Each Space Vehicle SV1-SV4 transmits a corresponding ranging signal RS1-RS4. Please note that for sake of simplicity, only four Space Vehicles SV1-SV4 are illustrated in FIG. 1.

When determining the position of the mobile station MS1 in FIG. 1 using mobile station assisted AGPS, the mobile station MS1 receives assistance data from and reports measurement results to a location server 101. Based on the reported measurement results and apriori information on where the mobile station is located, the location server calculates the location of the mobile station MS1. Depending on how a location server is connected to a cellular network, AGPS can be divided into two categories, "control plane solutions to AGPS" and "user plane solutions to AGPS".

In "control plane solutions to AGPS", the location server functionality (which may be implemented in a separate location server node, sometimes referred to as a Serving Mobile Location Center (SMLC) or Standalone SMLC (SAS), or integrated together with other functionality in other network nodes such as radio network controllers) is tightly integrated with the cellular network and assistance data and measurement results are communicated using so called control plane signaling. This solution is further characterized in that typically the location server would receive information of in which cell a mobile station is currently operating and the location server would apply this information as the apriori location of the mobile station when calculating the location of the mobile station. Hence the uncertainty in the apriori location information corresponds to the cell size.

In "user plane solutions to AGPS", the location server functionality is less closely integrated with the cellular network and assistance data and measurement results are communicated using so called user plane signaling, i.e. ordinary user data packets are used to convey this information transparently to the cellular network. This solution is further characterized in that the location server may not receive information of in which cell a mobile station is located or at least may not always be able to associate a given cell identity with a specific geographical area corresponding to the area covered by the cell. Hence, for user plane solutions to AGPS, the uncertainty in the mobile station apriori location information may be significantly larger than the cell size and may correspond to e.g. the size of the country in which the mobile station is currently operating.

In the example scenario of FIG. 1, a user plane solution to AGPS is illustrated where the location server 101 is connected to the cellular network NET1 via an Internet Protocol (IP) based packet data network 102.

Figure 2:
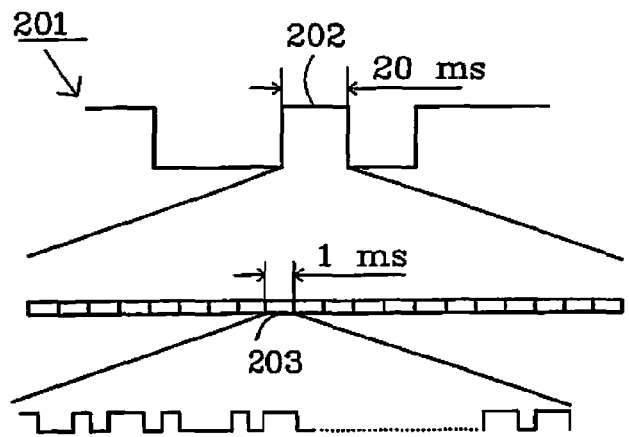
FIG. 2 is a diagram illustrating C/A code and navigation data bits in GPS ranging signals

The GPS Space Vehicles SV1-SV4 transmit ranging signals RS1-RS4 with a spectrum centered at 1575.42 MHz. FIG. 2 illustrates how each ranging signal RS1-RS4 includes a stream 201 of navigation data bits 202 that are spread by a spreading code defined by a so-called Coarse/Acquisition (C/A) code 203 that is unique for the Space Vehicle transmitting the signal. The C/A code 203 has a length of 1023 chips and a chip duration of $1/1.023 \times 10^6$ s, i.e. the C/A code comprises a sequence of +/−1 that changes at a rate of $1.023 \times 10^6$ Hz and repeats itself every 1 ms. The navigation bits 202 have a bit period of 20 ms, i.e. corresponding to 20 C/A code repetitions.

The navigation data includes among other things a set of so-called ephemeris parameters that enables the receiver to calculate the precise position of the satellites at the time of signal transmission. The precise time of transmission can also be read from the navigation data.

Figure 3:
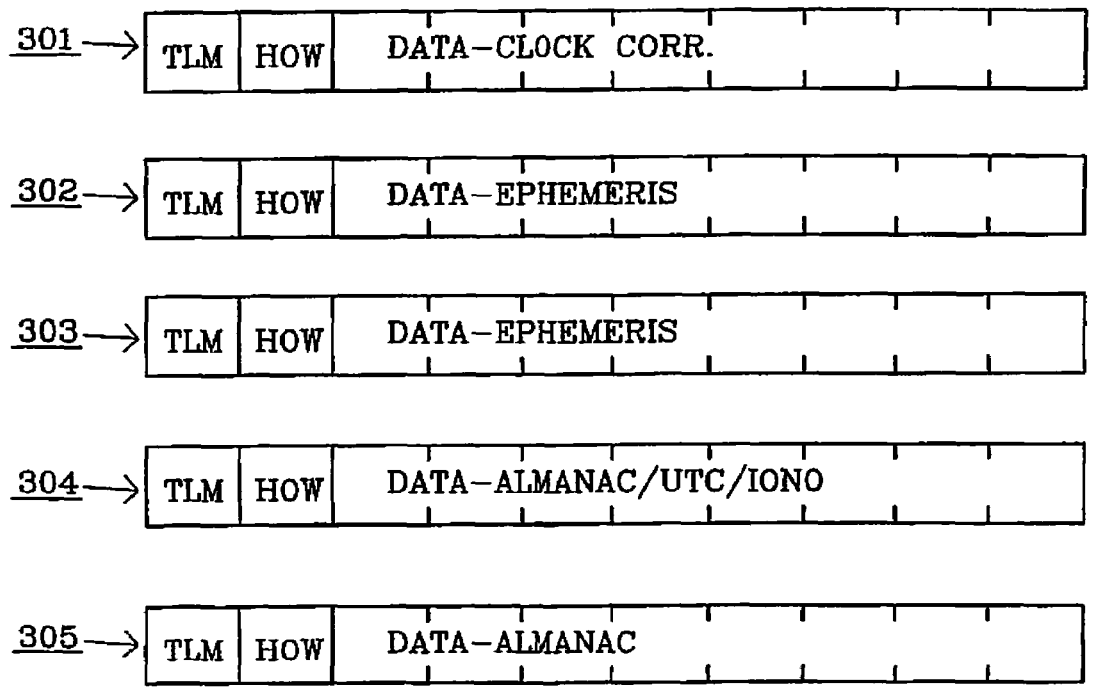
FIG. 3 is a block diagram illustrating the format of GPS navigation data in GPS ranging signals

FIG. 3 illustrates more in detail how the navigation data is further divided into 5 subframes 301-305, each of length 6 seconds. Each subframe 301-305 is divided into 10 words each of length 0.6 seconds and containing 30 data bits. A time stamp, GPS Time Of Week (TOW), is transmitted in the second word, the Handover Word (HOW), of every subframe 301-305. The indicated time is the time of transmission at the end of the subframe in question. The TOW is thus repeated every 6 seconds.

Each ranging signal RS1-RS4 basically defines a clock which is measured by the mobile station MS1. The clock indicates the time of signal transmission. If the mobile station MS1 knows the GPS system time, then the clock reading can directly be used to determine the time delay, and hence the range from the Space Vehicle transmitting the ranging signal to the mobile station MS1. By measuring three ranges and utilizing the knowledge about Space Vehicle locations at time of transmission, the location of the mobile station MS1 in three dimension can then be determined. However normally the mobile station MS1 does not have knowledge about precise GPS system time, so one more measurement is needed to eliminate the mobile station clock bias.

Figure 4:
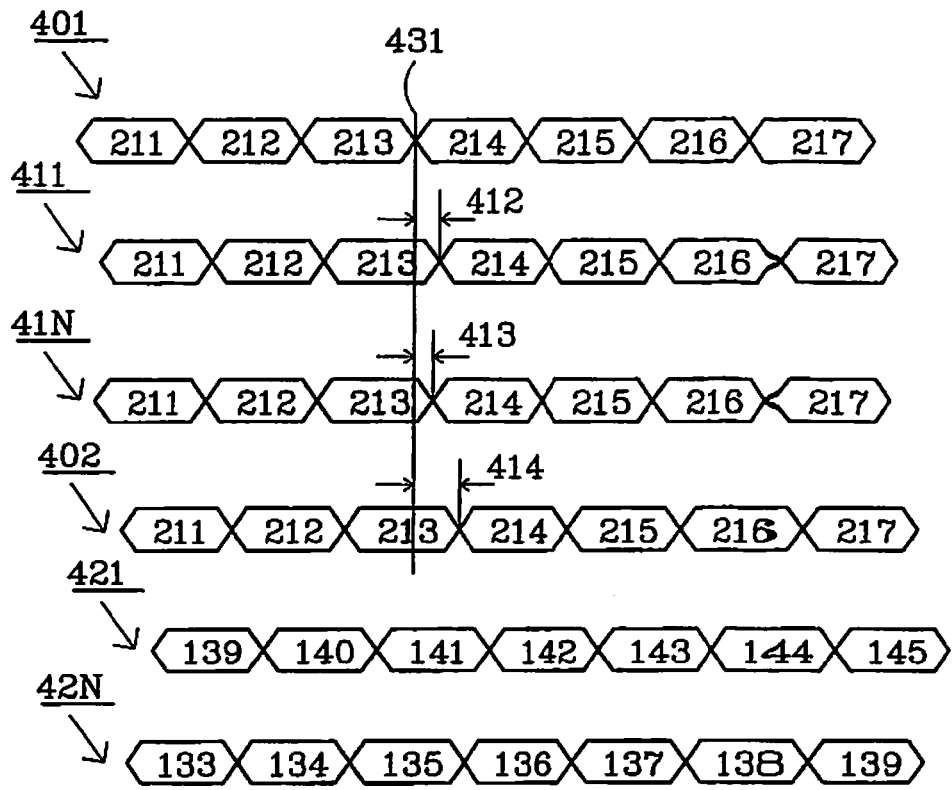
FIG. 4 is a diagram illustrating time in different parts of the system illustrated in FIG. 1

The sequences of FIG. 4 illustrate clock relations (expressed in milliseconds) for different parts of the system illustrated in FIG. 1. Each Space Vehicle SV1-SV4 carry precise atomic clocks to maintain clock stability. The Space Vehicle transmissions are however not perfectly synchronized to GPS system time as illustrated in FIG. 4. In FIG. 4, sequence 401 represents the GPS system time, sequence 411 represents the clock of Space Vehicle 1, sequence 41N represents the clock of Space Vehicle N, sequence 402 represents the clock of mobile station MS1 of FIG. 1 while sequences 421 and 42N respectively represent time as read in the ranging signals from Space Vehicle 1 and Space Vehicle N respectively received by the mobile station MS1. By drawing a vertical line 431 through the timing diagram one may obtain a snapshot of all clock readings as observed in various points in space. GPS system time 401 is defined as an ensemble average based on a set of ground station clocks and a subset of Space Vehicle clocks. As demonstrated in FIG. 4, the individual Space Vehicle clocks 411 and 41N and the mobile station clock 402 are slightly offset (see SV clock biases 412 and 413 and mobile station clock bias 414 respectively) compared to GPS system time 401. A model for the individual offsets of the Space Vehicle clocks is transmitted as part of the navigation message from each Space Vehicle. When the signals reach a point on the earth surface (e.g. the current location of mobile station MS1), they have been delayed with an amount depending on the range from the Space Vehicle in question to said point on the earth surface. The delay is typically 60-85 milliseconds (ms) as illustrated by the clock readings in FIG. 4.

When determining the position of a mobile station using AGPS, the mobile station measures the C/A code boundary locations position in time with respect to a selected point in time, i.e. the C/A code phase, for the received ranging signals. The C/A code phase is determined modulo 1 ms (i.e. one C/A code period).

A mobile station implementing mobile station based AGPS calculates its position at the selected point in time based on the measured C/A code phases of the received ranging signals and assistance data (received from the network) including space vehicle ephemeris and clock correction data together with apriori information about the mobile station location.

A mobile station, such as mobile station MS1 in FIG. 1, implementing mobile station assisted AGPS instead transmits a wireless signal reporting the C/A code phases (expressed in terms of whole and fractional chips of the C/A code from the selected point in time until the beginning of the next C/A code repetition) for the received ranging signals together with an estimate of the GPS system time corresponding to the selected point in time. Based on the information reported by the mobile station and apriori information about the mobile station location, a location server, such as location server 101 in FIG. 1, either in the cellular network or in another network calculates the position of the mobile station.

The inventor of the present invention has recognized that the AGPS way of measuring the C/A code phases modulo 1 ms and hence characterizing each ranging signal by time mod 1 ms, causes problems when the uncertainty in the apriori information of the mobile station location is too large. As demonstrated below, when the initial location uncertainty is more than 75 km, the so called pseudorange to a space vehicle can not be unambiguously reconstructed.

A GPS receiver basically measures the pseudorange to a number of satellites (please note however that in mobile assisted GPS, the GPS receiver integrated in the mobile station does not perform the complete calculations needed to determine the pseudoranges, but only provides basic data needed to calculate pseudoranges). The pseudorange is $$\rho_i = c \cdot (t_u - t_{ti}) \quad (1)$$

where $t_u$ is the GPS receiver (integrated in the mobile station) clock reading at the time of reception, and $t_{ti}$ is the time of signal transmission of the ith Space Vehicle, and c is the wave propagation speed. The pseudorange differs from true range with a number of perturbing factors (receiver clock bias, ionospheric and tropospheric delays, Space Vehicle clock bias, measurement errors, etc). For purpose of clarity, the influence of most of these error sources are neglected in the presentation below. There are known techniques to compensate for many of the above listed error sources (see e.g. [1], [2]). Furthermore the effect of Space Vehicle movement and earth rotation is also omitted as it is also well known in the art how to handle these effects (see e.g. [1], [2]). The simplified model is then that the measured pseuodrange obeys $$\rho_i = |x_u - x_{si}| + b + e_i \quad (2)$$

Here $x_u = (x_u \, y_u \, z_u)$ is a row vector containing the three-dimensional coordinates of the unknown receiver location. Similarly $x_{si}$ is the row vector containing the coordinates of the ith Space Vehicle. The notation $|z|$ means the norm of the vector quantity within brackets, which is equal to $(zz^T)^{1/2}$. In this case it can be interpreted as the distance between the GPS receiver/mobile station and the Space Vehicle. Furthermore b is the receiver clock bias (expressed as a range), $$b = c \cdot (t_u - t_{GPS}) \quad (3)$$

where $t_{GPS}$ stands for GPS system time. Finally $e_i$ is the measurement error.

The mobile station in mobile station assisted AGPS reports only pseudoranges modulo 1 C/A code period, ie the integer number of code periods in the pseudorange (1) is not known. It has to be reconstructed. Let R in general represent the range corresponding to the truncation interval used when measuring ranging signal timing. As an example, the range R corresponding to a truncation interval of one C/A code period (1 ms) is then $$R = c \cdot 10^{-3} \quad (4)$$

We thus have that $$\rho_i = k_i R + v_i \quad (5)$$

where $v_i$ is the reported measurement that satisfies $0 \leq v_i < R$, and where admissible values of the integer $k_i$ needs to be reconstructed. When the apriori initial location is large, several values of $k_i$ may be admissible. Furthermore the presence of a common bias term b makes it difficult to reconstruct $k_i$ exactly. However, from position calculation point of view it is the relative pseudoranges that matter, since any constant bias term will cancel in the position calculation.

Define the reconstructed pseudorange as $$\rho_i^* = k_i^* R + v_i \quad (6)$$

Next it will be shown that it is not necessary that $k_i^* = k_i$ for all i. However the relative pseudoranges must be correctly reconstructed, i.e.

$$k_i^* = k_i + X, \text{ for all } i, X \text{ an integer} \quad (7)$$

This can be explained as follows. Inserting (7) in (6) and using (5), (2) gives that $$\rho_i^* = k_i R + XR + v_i = \rho_i + XR = |x_u - x_{si}| + b + XR + e_i = |x_u - x_{si}| + b^* + e_i \quad (8)$$

i.e. that the reconstructed measurement equation (8) has the same structure as (2), the only difference being that b is replaced by $b^* = b + XR$.

The reconstruction is done in the following way. It is assumed that an apriori location $x_{u0}$ of the mobile station is known, along with an uncertainty $\Delta$, such that $$|x_u - x_{u0}| < \Delta \quad (9)$$

First we determine the predicted pseudorange to Space Vehicle #1 (arbitrarily selected among the Space Vehicles from which ranging signals have been received/measured)

$$\rho_1' = |x_{s1} - x_{u0}| \quad (10)$$

and next we try to find $k_1^*$ that satisfies $$k_1^* R + v_1 = \rho_1' \quad (11)$$

In most cases no exact solution is available so we round the result to the nearest integer so that $$k_1^* = \text{round}((\rho_1' - v_1)/R) \quad (12)$$

So we get $$\rho_1^* = \text{round}((\rho_1' - v_1)/R)R + v_1 \quad (12b)$$

Next step is to estimate the set of admissible values $k_i^*$, for $i>1$. Admissible pseudoranges $\rho_i^*$, satisfy $$\rho_i^* - \rho_1^* = \rho_i - \rho_1 = |x_u - x_{si}| - |x_u - x_{s1}| \quad (13)$$

In (13), measurement errors have been neglected. To obtain a sharp bound one may calculate the expected range difference (i.e. difference between ranges to Space Vehicle #1 and Space Vehicle #i respectively) at all possible receiver locations that satisfy (9), i.e. at all possible receiver locations within the initial location uncertainty area defined by $x_{u0}$ and $\Delta$. This way we obtain an inequality $$\delta\rho_i - \Delta_i \leq \rho_i^* - \rho_1^* \leq \delta\rho_i + \Delta_i, \quad i=2, \ldots, n \quad (14)$$

where $\delta\rho_i$ is the mean value of the maximum and minimum range difference that can be found anywhere within the initial uncertainty area. Similarly $\Delta_i$ is half the difference between the maximum and minimum range difference that can be found anywhere within the initial uncertainty area.

All admissible pseudoranges $\rho_i^*$, which in combination with $\rho_1^*$ form admissible relative pseudoranges $\rho_i^* - \rho_1^*$, satisfy equation (14).

Using (6), equation (14) can be rewritten as $$\delta\rho_i - \Delta_i \leq k_i^* R + v_i - \rho_1^* \leq \delta\rho_i + \Delta_i \quad (15)$$

Admissible values for $\rho_1^*$ can now be found by checking for varying $k_i^*$, whether the inequality (15) is satisfied. Note that several possible values of $k_i^*$ may be admissible. Possible values of the reconstructed pseudoranges (6) are stepped with a spacing of R meters. The width of the uncertainty region is $2\Delta_i$. So whenever $$2\Delta_i > R \quad (16)$$

there is a risk that the reconstruction cannot be done unambiguously.

A few alternative approaches for determining the admissible pseudoranges is presented next.

It may be cumbersome to determine $\delta\rho_i$ and $\Delta_i$ in (14) explicitly. A simpler way is to base the calculations on the individual pseudoranges. By noting that $\rho_i - b = |x_u - x_{si}|$ (neglecting measurement errors) one may determine $\delta\rho_{indi}$ and $\Delta_{indi}$ that fulfill $$\delta\rho_{indi} - \Delta_{indi} \leq \rho_i - b \leq \delta\rho_{indi} + \Delta_{indi}, \quad i=1, \ldots, n \quad (17)$$

where $\delta\rho_{indi}$ the mean value of the maximum and minimum range to satellite i that can be found anywhere within the initial uncertainty area and where $\Delta_{indi}$ is half the difference between the maximum and minimum range to satellite i that can be found anywhere within the initial uncertainty area.

The maximum and minimum ranges to satellite i and hence also $\delta\rho_{indi}$ and $\Delta_{indi}$ can be determined quite easily by applying simple geometry. Applying the triangle inequality one may then obtain $$|(\rho_i - b - \delta\rho_{indi}) - (\rho_1 - b - \delta\rho_{ind1})| \leq |(\rho_i - b - \delta\rho_{indi})| + |(\rho_1 - b - \delta\rho_{ind1})| \leq \Delta_{indi} + \Delta_{ind1}, \quad i=2, \ldots, n \quad (18)$$

Reformulating (18) and using the first equality in (13), we get $$\delta\rho_{indi} - \delta\rho_{ind1} - \Delta_{indi} - \Delta_{ind1} \leq k_i^* R + v_i - \rho_1^* \leq \delta\rho_{indi} - \delta\rho_{ind1} + \Delta_{indi} + \Delta_{ind1} \quad (19)$$

Possible values of the reconstructed pseudoranges (6) are stepped with a spacing of R meters. The width of the uncertainty region is $2(\Delta_{indi} + \Delta_{ind1})$. So whenever $$2(\Delta_{indi} + \Delta_{ind1}) > R \quad (20)$$

there is a risk that the reconstruction cannot be done unambiguously.

A further simplifying expression may be obtained by using only the relation (9) and the triangle inequality (in the form $||A| - |B|| \leq |A+B|$). First note that we may write $$|(\rho_i - b - \rho_i') - (\rho_1 - b - \rho_1')| \leq |\rho_i - b - \rho_i'| + |\rho_1 - b - \rho_1'| = ||x_u - x_{si}| - |x_{u0} - x_{si}|| + ||x_u - x_{s1}| - |x_{u0} - x_{s1}|| \leq |x_u - x_{si} - x_{u0} + x_{si}| + |x_u - x_{s1} - x_{u0} + x_{s1}| = |x_u - x_{u0}| + |x_u - x_{u0}| \leq 2\Delta \quad (21)$$

wherein $\rho_i'$ is the predicted pseudorange to Space Vehicle #i, $$\rho_i' = |x_{si} - x_{u0}|.$$

Using (13) and inserting the expression (6) we end with $$-2\Delta \leq k_i^* R + v_i - \rho_i' - (\rho_1^* - \rho_1') \leq 2\Delta \quad (22)$$

Possible values of the reconstructed pseudoranges (6) are stepped with a spacing of R meters. The width of the uncertainty region is $4\Delta$. So whenever $$4\Delta > R \quad (23)$$

there is a risk that the reconstruction cannot be done unambiguously. Thus, there is a risk for ambiguous pseudorange reconstruction when the uncertainty $\Delta$ is more than approximately 75 km and ranging signal timing measurements are performed using a truncation interval corresponding to one C/A code period.

The problem of ambiguous pseudorange reconstruction due to truncated measurement of ranging signal timing in combination with too large uncertainties in apriori location could be addressed by having a mobile station measure ranging signal timing for each ranging signal without any truncation. This would however require decoding Time Of Week information on each measured ranging signal which significantly increases the processing delays and may also decrease the detection sensitivity of the GPS receiver integrated in the mobile station since it is significantly more difficult to decode the Time Of Week information than to detect the C/A code boundaries. For mobile assisted AGPS, it would also require modifications of the messages used to report the ranging signal measurement results in order to report not only truncated timing but complete timing of the ranging signals The present invention addresses the above elaborated problem by providing ways of significantly reducing the risk that, in the context of AGPS (both mobile station based and mobile station assisted AGPS), the apriori location uncertainty of a mobile station causes ambiguous pseudorange reconstruction. At the same time the invention also avoids the need for decoding Time Of Week on each measured ranging signal and the associated disadvantages.

FIG. 5 illustrates a basic method according to the invention for determining a location at which ranging signals from at least three satellites have been received, wherein said location is apriori known to be located within an initial location uncertainty area.

The basic method includes performing at least one pseudorange selection cycle. All embodiments of methods according to the invention includes performing an initial selection cycle 511 (comprising substeps 501-504 in FIG. 5). Some embodiments of the invention may optionally include one or more additional selection cycles 512 (comprising substeps 506-508).

After performing pseudorange selection in the at least one pseudorange selection cycle, said location is determined at step 505 by utilizing pseudoranges selected after performing said pseudorange selection cycles. Thus step 505 may in some embodiments be performed immediately after the initial selection cycle 511, and may in other embodiments be performed after one or more additional selection cycles 512.

The initial selection cycle 511 includes substeps 501-504.

At substep 501, a first pseudorange $\rho_1^*$ is determined which with respect to said initial location uncertainty area is an admissible pseudorange associated with a first satellite.

At step 502, all pseudoranges associated with at least two additional satellites which combined with said first pseudorange form admissible relative pseudoranges are determined. Mathematically, a pseudoranges $\rho_i^*$ associated with a satellite i forms an admissible relative pseudorange when combined with the first pseudorange $\rho_1^*$ if expression (14) is satisfied.

At substep 503 a set of pseudorange vectors representing all possible combinations of the determined pseudoranges associated with said first and at least two additional satellites are formed. Each pseudorange vector thus includes the first pseudorange associated with the first satellite (e.g. SV1 in FIG. 1) and a pseudorange associated with each different satellite among the at least two additional satellites (e.g. SV2 and SV3 in FIG. 1).

At substep 504 a set of selected pseudorange vectors is formed by selecting at least one vector from said set of pseudorange vectors, wherein at least when said set of pseudorange vectors includes plural vectors, said selecting includes evaluating each vector in said set of pseudorange vectors according to a predetermined rule for initial vector selection. In some embodiments of the invention, such evaluation may be performed regardless of the number of vectors in the set of pseudorange vectors, i.e. also when there is a single vector. In other embodiments of the invention, such evaluation may be performed only when there are plural vectors in the set of pseudorange vectors, i.e. if there is a single vector in the set of psedurange vectors, this single vector may be selected without performing such evaluation. The predetermined rule for initial vector selection is selected so as to eliminate pseudorange vectors representing less probable combinations of pseudoranges. Different embodiments of the invention may apply different rules for initial vector selection. For embodiments where the additional at least two satellites equals exactly two satellites, i.e. when each vector includes pseudoranges from three different satellites, the rule for initial vector selection would typically be based on comparing the locations associated with the different vectors with the initial uncertainty area. For embodiments where the additional at least two satellites includes more than two satellites, i.e. when each vector includes pseudoranges from four or more satellites, the alternatives for defining different rules of initial vector selection includes also calculating a minimum loss function value for each new pseudorange value and selecting the pseudorange vector having the least minimum loss function value or all pseudorange vectors having minimum loss function values below a threshold.

The optional one or more additional selection cycle 512 includes substeps 506-508.

At substep 506, all pseudoranges associated with at least one additional satellite which combined with said first pseudorange form admissible relative pseudoranges (i.e. which satisfy expression (14)) are determined.

At substep 507 a new set of pseudorange vectors are formed representing all possible combinations of the set of vectors selected in the previous selection cycle and said determined pseudoranges associated with said at least one additional satellite. Since each pseudorange vector in the new set of pseudorange vectors include a pseudorange associated with each of said at least one additional satellite, the dimension of the new pseudorange vector is increased as compared to the dimension of the pseuodrange vectors selected in the previous selection cycle.

At substep 508, a new set of selected pseudorange vectors is formed by selecting pseudorange vectors from the new set of pseudorange vectors, wherein at least when said new set of pseudorange vectors includes plural vectors, said selecting includes evaluating each vector in said new set of pseudorange vectors according to a predetermined rule for subsequent selection. In some embodiments of the invention, such evaluation may be performed regardless of the number of vectors in the new set of pseudorange, i.e. also when there is a single vector. In other embodiments of the invention, such evaluation may be performed only when there are plural vectors in the set of pseudorange vectors, i.e. if there is a single vector in the new set of psedurange vectors, this single vector may be selected without performing such evaluation. The predetermined rule for subsequent vector selection is selected so as to eliminate pseudorange vectors representing less probable combinations of pseudoranges. Different embodiments of the invention may apply different rules for subsequent vector selection, e.g. based on comparing the locations associated with the different vectors with the initial uncertainty area, based on calculating a minimum loss function value for each new pseudorange value and selecting the pseudorange vector having the least minimum loss function value or all pseudorange vectors having minimum loss function values below a threshold.

Embodiments of the invention could be implemented both in control nodes on the network side (e.g. for supporting mobile station assisted AGPS) as well as in mobile stations (e.g. for supporting mobile station based AGPS).

Figure 8:
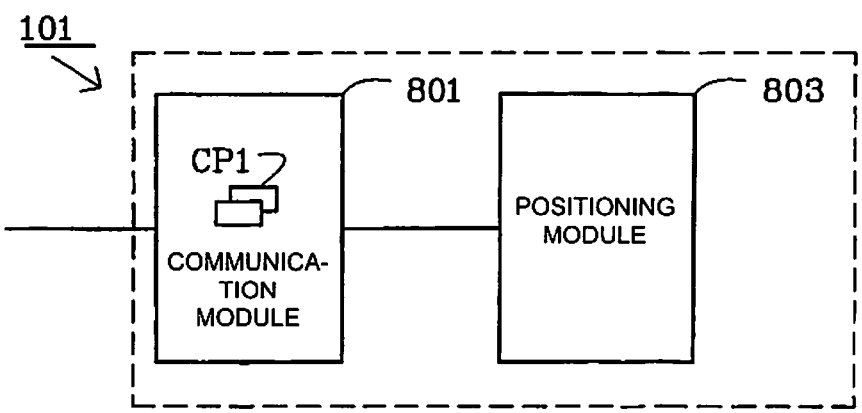
FIG. 8 is a schematic block diagram of a location server providing an example embodiment of an apparatus according to the invention.
Figure 9A:
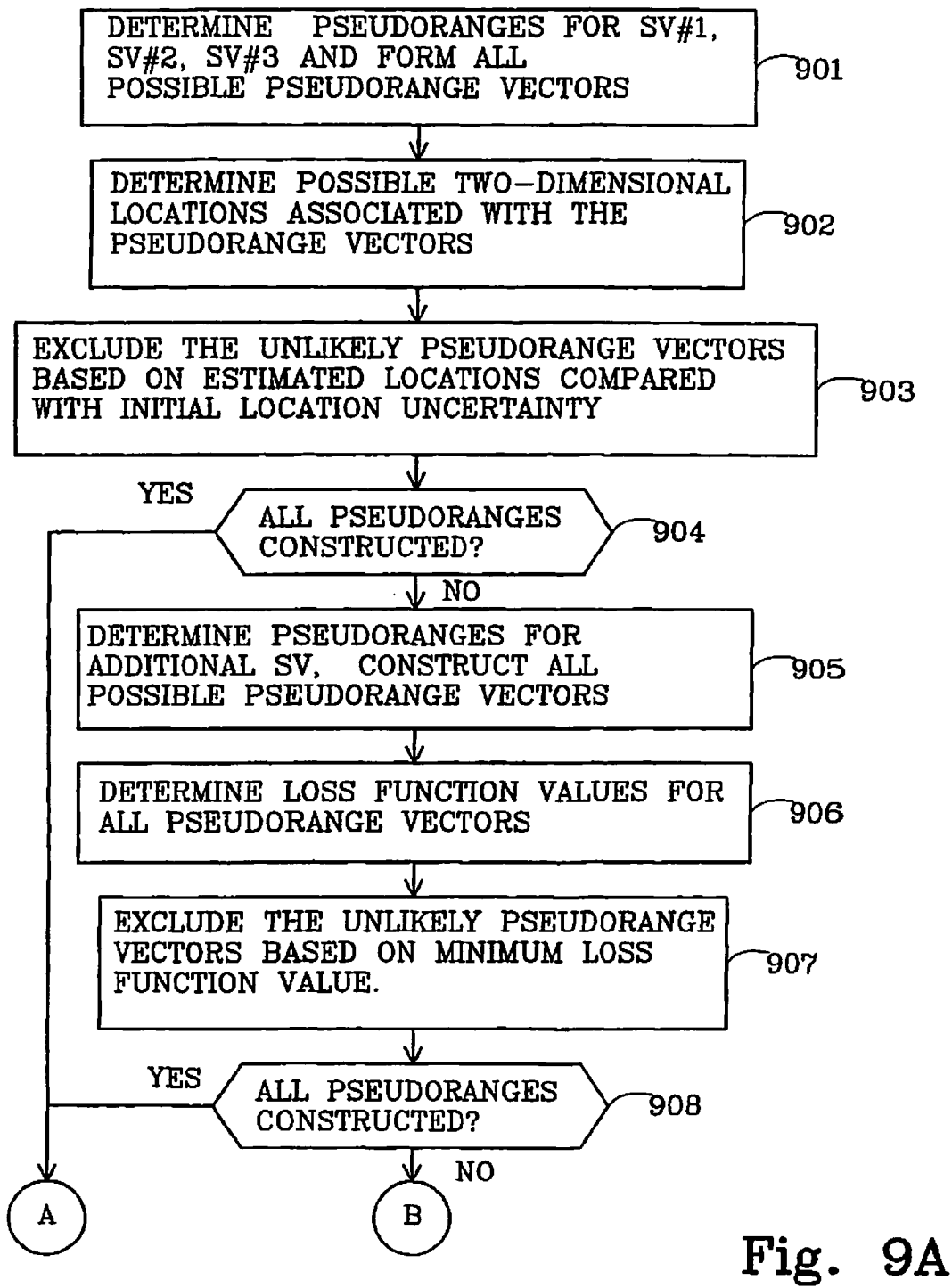
FIGS. 9A-B is a flow diagram illustrating a detailed example embodiment of a method according to the invention
Figure 9B:
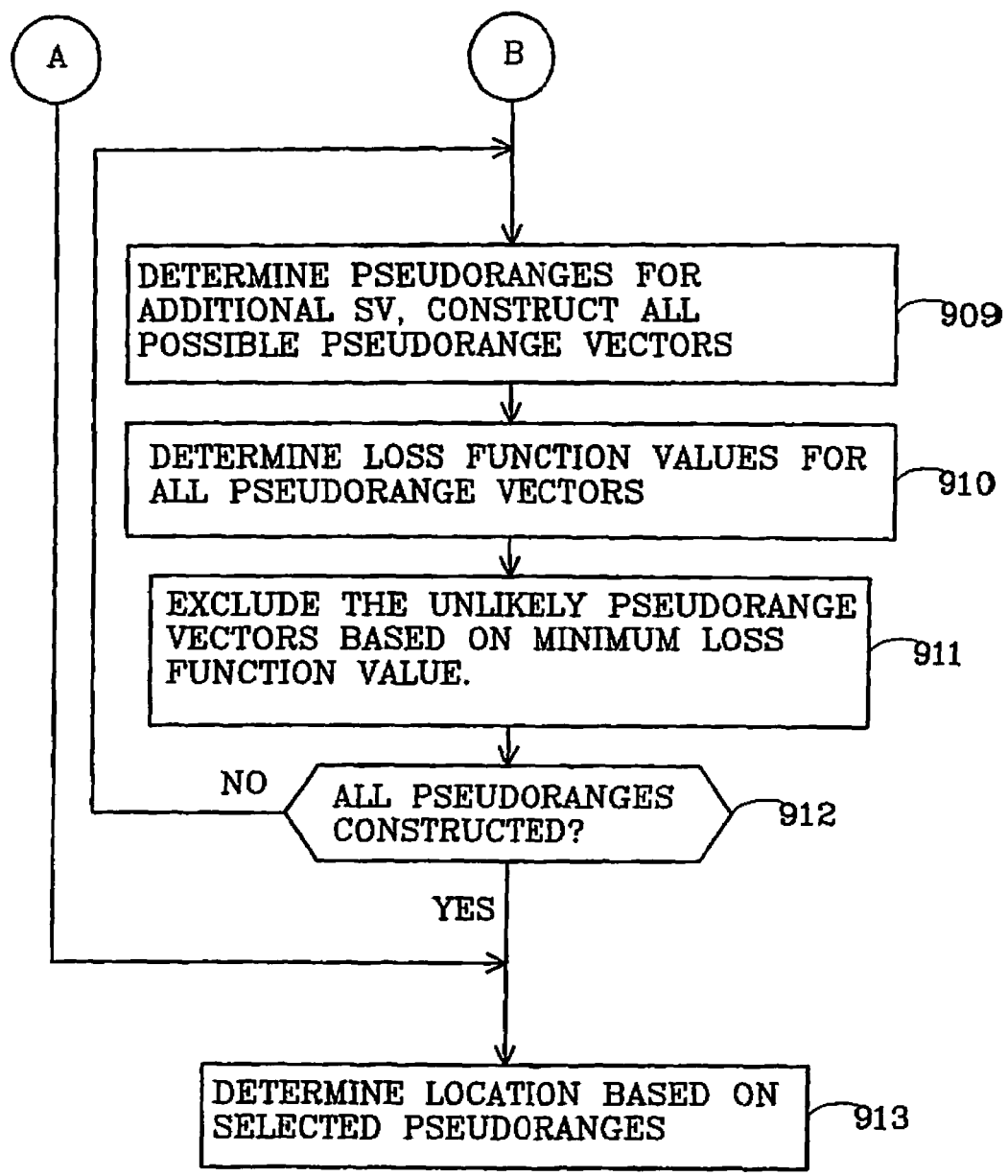
Figure 10:
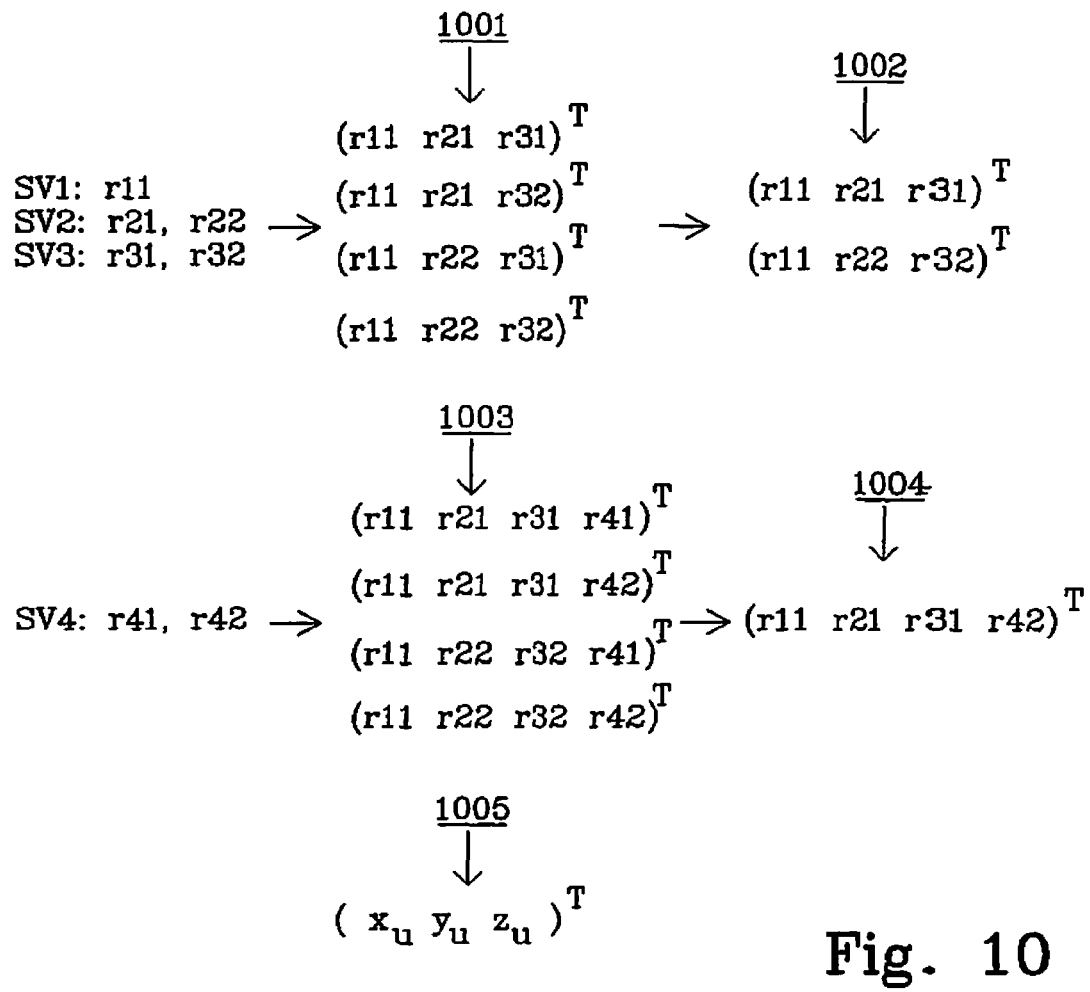
FIG. 10 is a diagram illustrating results and intermediate results when performing the method of FIGS. 9A-9B.

First exemplary embodiments of a method and an apparatus according to the invention implemented in the location server node 101 of FIG. 1 are illustrated in FIGS. 8-10. Before elaborating on said first exemplary embodiments of the invention, some details of the structure and processing performed in the mobile station MS1 of FIG. 1 in connection with mobile assisted AGPS are elaborated in connection with FIGS. 6 and 7 below.

Figure 6:
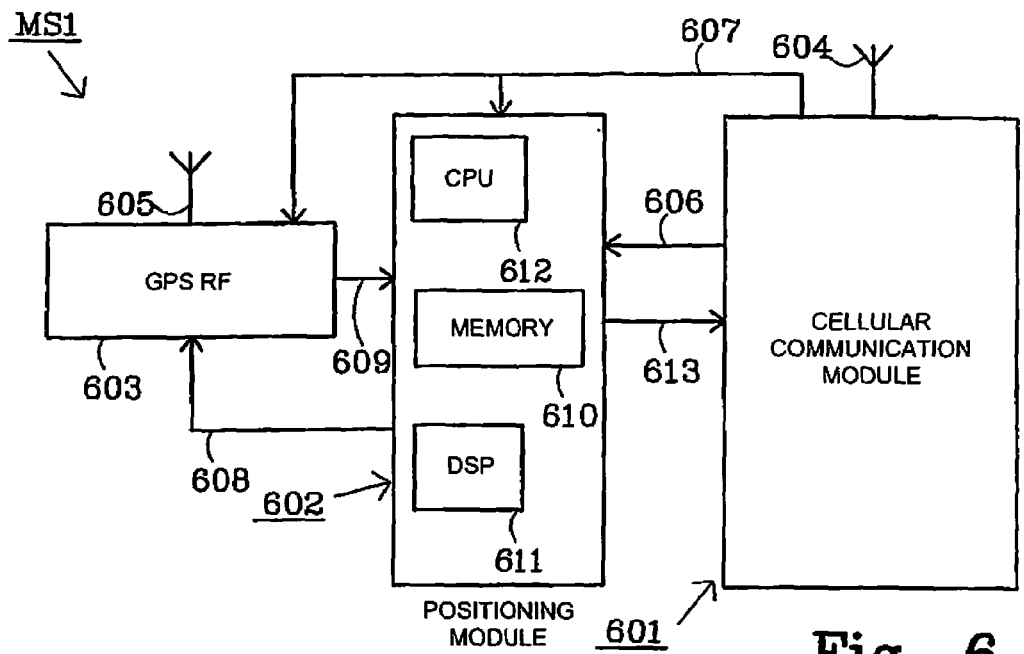
FIG. 6 is a schematic block diagram of a mobile station.

FIG. 6 is a block diagram illustrating the structure of the mobile station MS1. The mobile station MS1 includes a cellular communication module 601, a positioning module 602, a GPS RF front end 603, an antenna 604 for communication with the cellular network and a GPS antenna 605. The positioning module 602 includes a CPU 612, memory 610 and a Digital Signal Processor (DSP) 611. The cellular communication module 601 wirelessly receives assistance data from the cellular network and wirelessly transmits measurement results to the cellular network via base stations in the cellular network. The assistance data could consist of ephemeris and clock corrections for visible satellites, an approximate location of the mobile station MS1 and an approximate GPS system time. Alternatively the assistance data could contain explicit assistance data intended only for assisting the correlation processing. The communication module 601 forwards received assistance data to the positioning module 602 using the interface 606 while measurement results are provided from the positioning module 602 to the communication module 601 using interface 613. The communication module 601 also provides the GPS RF front end 603 and the positioning module 602 with a clock reference 607. The GPS RF front end module 603 is controlled by the positioning module 602 using interface 608.

Figure 7:
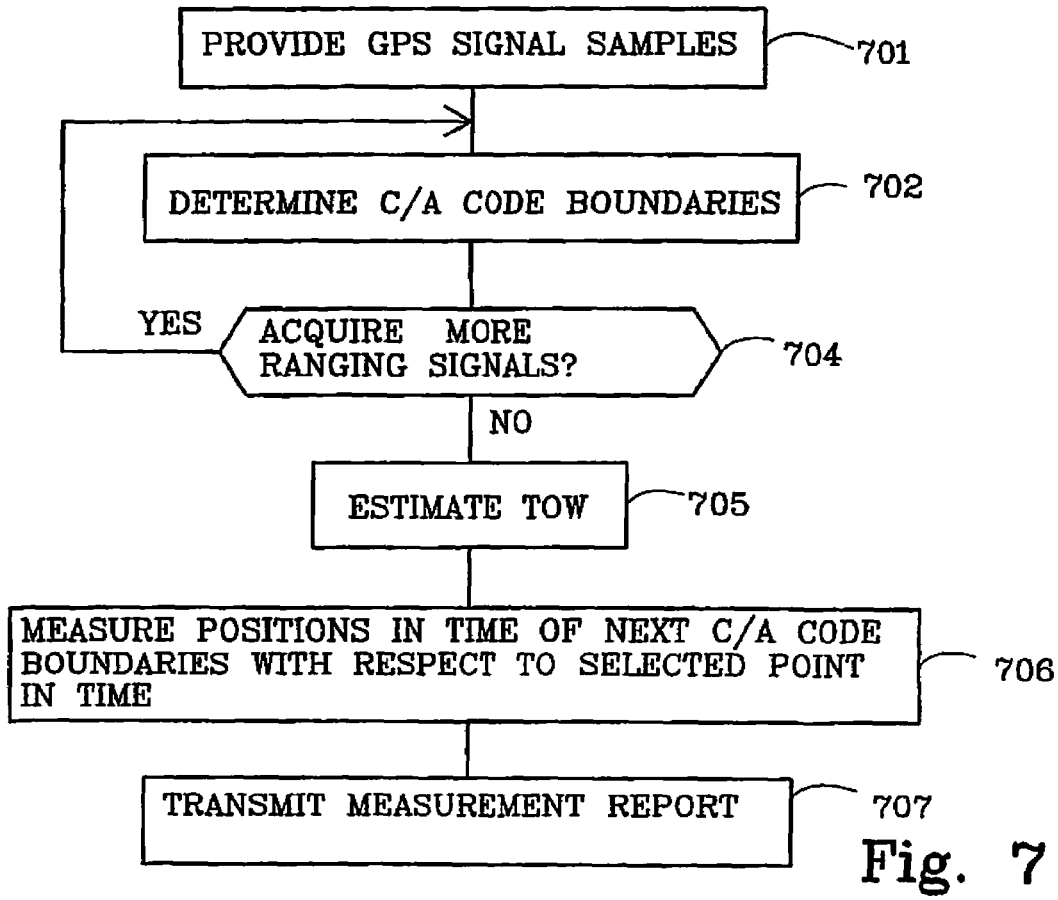
FIG. 7 is a flow diagram illustrating processing performed by the mobile station of FIG. 6.

FIG. 7 illustrates processing performed by the mobile station MS1 when it receives a positioning request.

When the positioning module 602 receives a positioning request from the communication module 601, it requests the GPS RF front end 603 to provide GPS signal samples at step 701. The GPS RF front end 603 receives the GPS frequency band through the antenna 605, downconverts the signal to baseband, separates the signal into in-phase (I) and quadrature (Q) components, samples and converts the signals into digital format, and outputs these to the positioning module 602 through interface 609. The positioning module 602 stores the received I and Q data in memory 610.

Step 702 define processing performed on each individual ranging signal RS1-RS4 which is included in the measurement report transmitted at step 707. Please note that even though FIG. 7 illustrates sequential processing (see step 704) of each individual ranging signal, processing related to different ranging signals are preferably performed in parallel.

A ranging signal y as a function of time t received from an arbitrary Space Vehicle SV1-SV4 by the mobile station MS1 can in a simplified way be written:

$$y(t)=a \cdot c(t-\tau) \cdot d(t-\tau) \cdot \exp\{i \cdot (\omega_0 t + \omega_d t + \phi)\} + e(t).$$

Here a is the amplitude of the received signal, c(t) is the C/A code of the Space Vehicle and d(t) is the navigation data bit stream (see FIG. 2). The term $\tau$ is the unknown delay of the signal which is a function of the distance from the Space Vehicle to the position of mobile station MS1, $\omega_0$ is the GPS carrier frequency, $\omega_d$ is the Doppler frequency of the signal, $\phi$ is an unknown phase and e(t) noise.

At step 702 the C/A code boundaries of a ranging signal are determined by the Digital Signal Processor 611 in the positioning module 602 using correlation that test all possible code phase and Doppler shifts for the ranging signal. Once step 702 has been initially completed for a ranging signal, the DSP 611 maintains synchronization with said ranging signal by tracking changes in C/A code boundary timing of said ranging signal.

If more ranging signals need to be acquired (an alternative YES at step 704) step 702 is repeated for a next ranging signal (as already discussed, the processing of step 702 is preferably performed in parallel for several ranging signals and not sequentially as indicated by FIG. 7). The decision in step 704 on whether more ranging signals should be acquired or not could be based on the number of ranging signals acquired so far (at least 3 or preferably 4 ranging signals should be acquired, but acquiring more ranging signals would improve the precision of the calculated position) and timing requirements (the response time for providing a measurement report signal could be configured by a parameter to e.g. within 16 seconds of receiving a positioning request).

If enough ranging signals have been acquired (an alternative NO at step 704), the GPS Time Of Week (TOW) of a selected point in time is estimated at step 705. Please note that preferably, as soon as step 702 has been completed for a first ranging signal, step 705 is performed based on said ranging signal in parallel with acquiring additional ranging signals.

There are several alternatives for how step 705 may be performed. Typically TOW estimation is based on determining the TOW transmitted in the so called Handover Word (HOW) of one ranging signal (see FIG. 3), preferably the first aquired ranging signal, and then compensating for the propagation delay from signal transmission by the Space Vehicle until signal reception by the mobile station MS1.

Determining the transmitted TOW can be performed by direct decoding of the transmitted TOW. This alternative implies that data is demodulated at a rate of 20 ms and normally requires that subframe boundaries are determined followed by decoding of the Handover Word, from which the TOW, ie the transmission time $t_n$, can be derived. Each subframe has a length of 6 s, so this procedure may require that approximately 8 seconds of navigation data is collected. TOW demodulation works down to approximately −172 dBW, assuming 0 dB antenna and is in fact the limiting factor for detection sensitivity.

Alternatively, the transmitted TOW can be determined by reconstruction using correlation techniques. This procedure also requires that demodulated data bits are generated, but instead of direct decoding, correlation is made with known transmitted navigation data bits (e.g. the contents of the so-called Telemetry Word and the HOW word which may be sent to the mobile station as part of the assistance data). This requires that the GPS time is a priori known to within a few seconds. This procedure works to somewhat lower signal levels than direct TOW decoding, but most likely the performance is limited by the tracking loops that may loose lock at such low signal levels. Typically phase locked loops or automatic frequency control loop are employed for this. But it is expected that this will work down to say −179 dBW.

Compensating for the propagation delay could be performed by applying an expected average propagation delay of 77 ms. Alternatively a more accurate propagation delay compensation can be derived from assistance data received from the cellular network by the mobile station MS1 according to the principles elaborated in copending US patent application by inventors Ari Kangas and Janos Toth-Egetö filed Sep. 29, 2004.

At step 706, the positions in time with respect to the selected point in time are measured for the next C/A code boundaries following the selected point in time. More specifically, for each acquired ranging signal, the position of the next C/A code boundary following the selected point in time is measured by registering the number of whole and fractional chips from the selected point in time until the next C/A code boundary. Finally, at step 707 a measurement report signal reporting the measurement results is wirelessly transmitted by the mobile station MS1 to the cellular network NET1. The measurement report signal is in this example scenario transmitted as ordinary user data in the user plane addressed to the location server 101. Hence the measurement report signal is transparently routed through the cellular network NET1 via the IP based network 102 to the location server 101.

FIG. 8 schematically illustrates the structure of the location server 101 according to a first exemplary embodiment of an apparatus according to the invention. The location server includes a communication module 801 and a positioning module 803. The communication module 801 receives the measurement report and forwards measurement data to the positioning module 803. The positioning module includes one or more processors CP1 programmed to determine the location of the mobile station MS1 using the provided measurement data (including the measured timing information for each reported ranging signal) and apriori information on the mobile station location. The apriori information can e.g. be derived from a Public Land Mobile Network (PLMN) identity included in the signal from the mobile station MS1 and indicating in which network the mobile station MS1 is operating. The PLMN identity could e.g. be included as part of the cell identity of the cell in which the mobile station is currently operating. Using the provided PLMN identity, the positioning module 803 could derive the apriori location information e.g. by retrieving the coordinates of the centre of the country in which the mobile station MS1 is operating, together with a radius corresponding to the maximum distance from said centre until the border of said country from a table. The hierarchical nature of cell identities could also be exploited, in particular for large countries, to identify a particular region within a country in which the mobile station is operating. Maintaining a table of centre/radius information for different countries, or regions within said countries, is significantly less burdensome than trying to maintain a global data base with information on the geographical coordinates of each cell.

Before discussing more in detail the processing performed by the location server 101 according to an exemplary embodiment of a method according to the invention, some basic calculations for determining a mobile station position are described below.

The measurement equation (2) may be expressed in vectorized form as $$\rho = |1_n \cdot x_u - X_s| + b 1_n + e \quad (24)$$

Here $\rho$ is the column vector of length n containing the pseudoranges, $1_n$ is a column vector of length n containing only ones. $X_s$ is a matrix where the ith row contains the coordinates $x_{si}$ of the ith satellite (Space Vehicle). It is assumed here that the norm $|Z|$ is calculated for each row of the matrix Z within brackets.

A Taylor series expansion around the inital estimate of the unknown parameters $x_u$ and b may be expressed as $$\rho = |1_n \cdot x_u - X_s| + (b-b_0)1_n + e = |1_n \cdot x_{u0} - X_s| + G \cdot ((x_u - x_{u0})(b - b_0))^T + v \quad (25)$$

wherein G is the geometry matrix which contains the derivatives of the pseudoranges with respect to the parameters $x_u$ and b, v is the sum of the measurement error term e and the higher order Taylor series terms. Let $$r_i = |x_{u0} - x_{si}| \quad (26)$$

then G is a matrix with the ith row being equal to $$G_i = [(x_{u0} - x_{si})/r_i (y_{u0} - y_{si})/r_i (z_{u0} - z_{si})/r_i 1] \quad (27)$$

The least squares solution to (25) is equal to $$(x_u b)^T = (x_{u0} b_0)^T + (G^T G)^{-1} G^T (\rho - |1_n \cdot x_{u0} - X_s| - b_0 1_n) \quad (29)$$

The least squares minimum loss function value, is equal to $$V = (\rho - |1_n \cdot x_{u0} - X_s| - b_0 1_n)^T (I - G(G^T G)^{-1} G^T)(\rho - |1_n \cdot x_{u0} - X_s| - b_0 1_n) \quad (30)$$

The minimum loss function value is a measure of how well the predicted pseudoranges based on an updated parameter estimate, match the measured pseudoranges.

FIGS. 9A-B illustrates processing performed by the location server 101, and more in particular the positioning module 803, according to a first exemplary embodiment of a method according to the invention.

The procedure starts at step 901 by calculating a first pseudorange $\rho_1^*$ for an arbitrary first satellite (Space Vehicle) according to equation (12b). Further all pseudoranges $\rho_2^*$ (for a second satellite) and $\rho_3^*$ (for a third satellite) which combined with the first pseudorange $\rho_1^*$ would form admissible relative pseudoranges are determined using any one of expressions (15), (19), or (22). Assuming $n_2$ and $n_3$ admissible pseudoranges were found for the second and third satellite respectively, then a set of $n_2 \cdot n_3$ candidate pseudorange vectors can be formed representing all possible combinations of the determined pseudoranges $\rho_1^*$, $\rho_2^*$ and $\rho_3^*$ associated with the first, second and third satellite respectively.

At step 902 a least squares estimate according to (29) is performed for each candidate pseudorange vector, but since only three measurements are used, only a two dimensional location fix can be made. It is most natural to estimate the x (latitude) and y (longitude) coordinates since the apriori uncertainty in the vertical dimension is typically smaller than the horizontal uncertainty. The reduced parameter vector $(x_u y_u b)^T$ is estimated for all candidate pseudorange vectors.

At step 903 a selection of the most likely pseudorange vector candidate(s) is done by considering the size of the update step in the horizontal dimension, i.e. by comparing the positions associated with the candidate pseudorange vectors and the initial location uncertainty area defined by the apriori location $x_{u0}$ of the mobile station and the uncertainty $\Delta$. Hence $((x_u - x_{u0})^2 + (y_u - y_{u0})^2)^{1/2}$ is determined for all candidate vectors. Since it is known apriori that $((x_u - x_{u0})^2 + (y_u - y_{u0})^2)^{1/2} < \Delta$ for the true parameter vector $x_u$, $y_u$ those candidates that generate an update step larger than a defined threshold value, selected as larger than $\Delta$, are excluded from further calculations. The threshold could preferably be selected larger than $\Delta$ with a margin accounting for the fact that the least squares solution normally has to be performed iteratively, since the least squares equation (29) is only an approximation for the original non-linear problem (24).

Note that in this case the residual V in (30) cannot be used, since it will in most cases be equal to zero in the case of three measurements, three equations.

In the next step 904 it is checked whether all pseudoranges have been reconstructed, i.e. whether all measured satellite ranging signals have been considered.

If all pseudoranges have been reconstructed (an alternative YES at step 904), processing continues at step 913 where the mobile station position is calculated/estimated.

Otherwise (an alternative NO at step 904), processing continues at step 905 where all pseudoranges $\rho_4^*$ associated with an additional (fourth) satellite and which combined with the first pseudorange $\rho_1^*$ would form admissible relative pseudoranges are determined using any one of expressions (15), (19), or (22). A new set of all possible candidate pseudorange vectors is formed by combining the set of pseudorange vectors selected at step 903 with all determined pseudoranges $\rho_4^*$ associated. with the additional (fourth) satellite.

At step 906, the loss function value (30) is calculated for all candidate pseudorange vectors, assuming also in this case that only a two-dimensional location vector is estimated. Note that in this step no explicit solution (29) needs to be calculated.

At step 907, the candidate pseudorange vector that minimized the loss function (30) is selected.

At the next step 908 it is checked whether all pseudoranges have been reconstructed, i.e. whether all measured satellite ranging signals have been considered.

If all pseudoranges have been reconstructed (an alternative YES at step 908), processing continues at step 913 where the mobile station position is calculated.

Otherwise (an alternative NO at step 908), in the following steps, enough ranging signal measurements are available to enable a three-dimensional solution. The procedure for pseudorange reconstruction is thus repeated at step 909 for $\rho_k^*$ where k=5, i.e. all pseudoranges $\rho_5^*$ associated with an additional (fifth) satellite which combined with the first pseudorange $\rho_1^*$ would form admissible relative pseudoranges are determined using any one of expressions (15), (19), or (22) and a new set of all possible candidate pseudorange vectors is formed by combining the set of candidate pseudorange vectors selected at the previous selection step with all determined pseudoranges $\rho_5^*$ associated with the additional (fifth) satellite.

The loss function values are computed at step 910 for all candidate pseudorange vectors in the new set using (30). The most unlikely candidate pseudorange vectors are excluded from further consideration at step 911 based on said loss function values, i.e. a new set of selected candidate pseudorange vectors is formed by excluding unlikely candidate pseudorange vectors formed at step 909. In this embodiment, the candidate pseudorange vector that minimized the loss function is selected.

At step 912 it is checked whether all pseudoranges have been reconstructed, i.e. whether all measured ranging signals have been considered. If all pseudoranges have been reconstructed (an alternative YES at step 912), processing continues at step 913 where the mobile station position is calculated.

Otherwise (an alternative NO at step 912), the procedure of pseudorange reconstruction and exclusion of unlikely pseudorange vectors is repeated from step 909 to determine pseudoranges $\rho_k^*$ associated with additional satellites k where k is incremented, before each new iteration of steps 909-911.

When all pseduoranges have been reconstructed, i.e. all acquired satellite ranging signals have been considered, the mobile station position $x_u$ is calculated/estimated by determining the least squares solution (29) at step 913 possibly using an iterative scheme.

The pseudorange selection performed in the procedure illustrated in FIG. 9 is organized in an initial pseudorange selection cycle including steps 901-903 and additional pseudorange selection cycles 905-907 (operating on pseudoranges associated with four satellites) and 908-911 (operating on pseudoranges associated with more than four satellites) respectively.

FIG. 10 illustrates an example scenario of results and intermediate results when performing the method according to FIGS. 9A-B. In this example scenario, it is assumed that ranging signal measurements associated with the four satellites of FIG. 1 are available, which implies that only the initial selection cycle (steps 901-903) and the additional selection cycle (905-907) operating on pseudoranges associated with four satellites are performed.

FIG. 10 illustrates the first pseudorange $\rho_1^*$ (r11 in FIG. 10), pseudoranges $\rho_2^*$ (r21, r22 in FIG. 10) and $\rho_3^*$ (r31, r32 in FIG. 10) associated with the second satellite SV2 and the third satellite SV3 respectively which in this example scenario are determined at step 901. Based on the determined pseudoranges, a set 1001 of pseudorange vectors representing all possible combinations of said pseudoranges are also formed at step 901.

From the set 1001 of pseudoranges formed at step 901, a set 1002 of selected pseudorange vectors is derived at steps 902-903 by selecting pseudorange vectors which are associated with locations within the initial uncertainty area. As illustrated in FIG. 10, two pseudorange vectors are selected at steps 902-903 in this particular example scenario.

FIG. 10 further illustrates the pseudoranges $\rho_4^*$ (r41, r42 in FIG. 10) associated with the additional fourth satellite SV4 which are determined at step 905. Based on the determined pseudoranges $\rho_4^*$ associated with the fourth satellite SV4, a new set 1003 of pseudorange vectors representing all possible combinations of the pseduoranges $\rho_4^*$ and the set 1002 of selected pseudorange vectors from the previous selection cycle (i.e. the initial selection cycle in this example scenario) are also formed at step 905.

From the new set 1003 of pseudoranges formed at step 905, a new set 1004 of selected pseudorange vectors is derived at steps 906-907 by selecting the pseudorange vector which minimizes the minimum loss function (30).

Finally, according to this example scenario, the elements of the single pseudorange vector in the new set 1004 of selected pseudorange vectors are used at step 913 to determine the location (represented by vector 1005 in FIG. 10) at which the ranging signals from the four satellites SV1-SV4 were received.

Apart from the exemplary first embodiment of the invention disclosed above, there are several ways of providing rearrangements, modifications and substitutions of the first embodiment resulting in additional embodiments of the invention.

Figure 11:
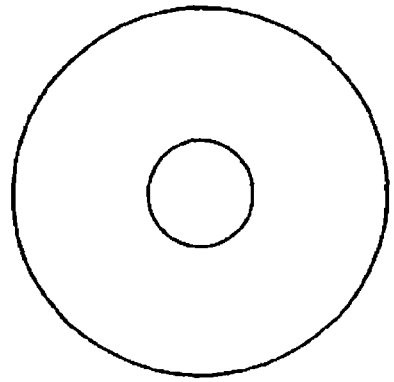
FIG. 11 shows an example of a computer-readable medium

In the first exemplary embodiment of the invention, the processing steps illustrated in FIGS. 9A-B are performed by digital data processing circuitry in the form of one or more conventional programmable processors. However, any digital data processing circuitry capable of performing said processing could be used, e.g. a state machine, an ASIC, a discrete logic circuit etc. In the first exemplary embodiment of the invention, as in other embodiments of the invention using programnable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 11) etc. Programmable devices performing processing according to the invention, can be dedicated to this task or used also for processing relating to other tasks.

An exemplary embodiment of the invention for use in the context of mobile station based AGPS could be derived from the illustrated first embodiment of the invention by essentially replacing step 707 of FIG. 7 with processing according to FIGS. 9A-9B in the positioning module 602 of the mobile station MS1. Thus the calculations performed by positioning module 903 of the location server 101 in the first exemplary emodiment would instead be performed by positioning module 602 of the mobile station MS1. An apriori estimate of the mobile station position together with satellite ephemeris data and clock corrections would be provided by the network as assistance data for use in the position calculations. Thus, the mobile station MS1 would become an exemplary embodiment of an apparatus according to the invention in this scenario.

The invention could of course be applied both in the context of control plane and user plane solutions to AGPS. As regards control plane solutions to AGPS, the invention is probably most interesting to apply in the context of extended range cells (in GSM, extended range cells could have a radius of up to 100 km) or when cell identity positioning (which typically is used as a basis for determining apriori location information) is not implemented in a network.

An alternative approach to performing pseudorange selection cycles 909-911 until all measured ranging signals have been considered would be to quit the loop of iterative selection cycles after a selection cycle resulting in the selection of a single pseudorange vector. An updated location uncertainty area within the initial location uncertainty area defined by the apriori location $x_{u0}$ of the mobile station and the uncertainty $\Delta$ could then be determined based on the selected single pseudorange vector. The unknonwn location of the mobile station, i.e. where the satellite ranging signals were received, could then be determined using the updated location uncertainty area. Since the updated location uncertainty area would be significantly smaller than the initial location uncertainty area, there is in practice no risk of ambiguous pseudorange reconstruction when determining the unknown location using the updated location uncertainty area. The actual location calculations could be performed as for normal GPS-positioning.

In situations where it would be desirable to handle even larger apriori location uncertainties in connection with AGPS, the present invention could be combined with the teachings of International Patent Application No PCT/IB2004/052040 by performing measurements modulo the navigation data bit length on received ranging signals as specified in said International Patent Application application and then determining the location at which said ranging signals were received as disclosed in this patent application.

In order to provide increased robustness against e.g. errors in estimated GPS time at signal arrival, position calculations may be performed in accordance with copending U.S. patent application No. 60/545194 by Ari Kangas.

There are several alternative rules that different embodiments of the invention may apply when evaluating and selecting pseudorange vectors in additional pseudorange selection cycles. Instead of applying the minimum loss function (30), a weighted minimum loss function $$V = (\rho - |1_n \cdot x_u - X_s| - b_0 1_n)^T Q^{-1} (\rho - |1_n \cdot x_u - X_s| - b_0 1_n) \tag{31}$$

could be applied where Q is the covariance matrix of range signal measurement errors.

Instead of selecting the pseudorange vector which minimized the loss function as in steps 907 and 909 in FIGS. 9A-9B, all pseudorange vectors that produce a loss function less than a defined threshold could be selected. Further, the evaluation rule applied may imply different evaluation criterias in different selection cycle iterations. One such example would be to select the pseudorange vector which minimized the loss function in the last iteration, but selecting all pseudorange vectors producing a minimum loss function value below a defined threshold in all but the last iteration. Another example of different evaluation criterias in different cycles would be to apply different threshold values for different iterations (generally applying narrower and narrower threshold values). Evaluation of pseudorange vectors could also be performed by calculating locations associated with each pseudorange vector and comparing the calculated locations to the initial location uncertainty area (i.e. similar to the comparision performed in the initial pseudrange selection cycle). It is also possible to evaluate the pseudorange vectors by a combined criteria based on both minimum loss function values (according to e.g equation (30) or (31)) and a comparision of associated locations and the initial uncertainty area.

In the first exemplary embodiment of the invention, truncated timing measurement results are available for all ranging signals RS1-RS4. In other embodiments of the invention, one or more ranging signals could have been measured without truncation. However, as long as truncated rangin signal measurements are performed for at least one of the satellites, i.e. the available measurement results include truncated timing measurement results for at least one satellite, there is a risk for ambiguous pseudorange reconstruction if the apriori location uncertainty area is large and hence the present invention may be used to provide increased robustness against ambiguous pseudorange reconstruction.

Even though the invention in its first exemplary embodiment has been applied in the context assisted GPS, the invention may of course be applied in connection with other satellite based positioning systems such as GALILEO or GLONASS to address situations where there is a risk that truncated ranging signal measurements in combination with a large apriori location uncertainty area implies a risk for ambiguous pseudorange reconstruction.

REFERENCES

[1] Navstar GPS Space Segment/Navigation user Interfaces, ICD-GPS-200, Revision IRN-200C-003, 11 Oct. 1999.
[2] Parkinson, Spilker Global Positioning System: Theory and Applications, Volume 1, AIAA, 1996

The invention claimed is:

1. A method for determining a location at which ranging signals from at least three satellites have been received, wherein results of measurements performed on said ranging signals include truncated timing measurement results for at least one of said satellites, and wherein said location is known to be located within an initial location uncertainty area, said method comprising the steps of:

performing at least one pseudorange selection cycle;
determining said location utilizing pseudoranges selected after performing said at least one pseudorange selection cycle,
wherein said at least one pseudorange selection cycle includes an initial selection cycle comprising the sub-steps of:
determinining a first pseudorange which with respect to said initial location uncertainty area is an admissible pseudorange associated with a first satellite;
determining all pseudoranges associated with at least two additional satellites which combined with said first pseudorange form admissible relative pseudoranges;
forming a set of pseudorange vectors representing all possible combinations of said determined pseudoranges associated with said first and at least two additional satellites;
forming a set of selected pseudorange vectors by selecting at least one vector from said set of pseudorange vectors,
wherein at least when said set of pseudorange vectors includes plural vectors, said selecting includes evaluating each vector in said set of pseudorange vectors according to a predetermined rule for initial vector selection.

2. A method according to claim 1, wherein said evaluating of each vector according to said predetermined rule for initial vector selection is performed only when said set of pseudorange vectors includes plural vectors.

3. A method according to claim 1, wherein said evaluating of each vector according to said predetermined rule for initial selection is performed also when said set of pseudorange vectors includes a single vector.

4. A method according to claim 1, wherein evaluation according to said predetermined rule for initial vector selection includes comparing locations associated with said vectors in said set of pseudorange vectors and the initial location uncertainty area.

5. A method according to claim 1, wherein when said at least two additional satellites includes more than two additional satellites, evaluation according to said predetermined rule for initial vector selection includes calculating a minimum loss function value for each vector in said set of pseudorange vectors.

6. A method according to claim 5, wherein vectors associated with minimum loss function values below a predefined threshold value are selected for inclusion in said set of selected pseudorange vectors.

7. A method according to claim 5, wherein the vector associated with the least minimum loss function value is selected for inclusion in said set of selected pseudorange vectors.

8. A method according claim 1, wherein said at least one pseudorange selection cycle includes at least one additional selection cycle comprising the substeps of:
   determining all pseudoranges associated with at least one additional satellite which combined with said first pseudorange form admissible relative pseudoranges;
   forming a new set of pseudorange vectors representing all possible combinations of pseudorange vectors selected in the previous selection cycle and said determined pseudoranges associated with said at least one additional satellite;
   forming a new set of selected pseudorange vectors by selecting at least one vector from said new set of pseudorange vectors, wherein at least when said new set of pseudorange vectors includes plural vectors, said selecting includes evaluating each vector in said new set of pseudorange vectors according to a predetermined rule for subsequent vector selection.

9. A method according to claim 8, wherein said evaluating of each vector according to said predetermined rule for subsequent vector selection is performed only when said new set of pseudorange vectors includes plural vectors.

10. A method according to claim 8, wherein said evaluating of each vector according to said predetermined rule for subsequent vector selection is performed also when said new set of pseudorange vectors includes a single vector.

11. A method according to claim 8, wherein evaluation according to said predetermined rule for subsequent vector selection includes comparing locations associated with said vectors in said new set of pseudorange vectors and the initial location uncertainty area.

12. A method according to claim 8, wherein evaluation according to said predetermined rule for initial vector selection includes calculating a minimum loss function value for each vector in said new set of pseudorange vectors.

13. A method according to claim 12, wherein vectors associated with minimum loss function values below a predefined threshold value are selected for inclusion in said new set of selected pseudorange vectors.

14. A method according to claim 12, wherein the vector associated with the least minimum loss function value is selected for inclusion in said new set of selected pseudorange vectors.

15. A method according to claim 1, wherein the satellites are part of the Global Positioning System.

16. A method according to claim 1, wherein after a pseudorange selection cycle resulting in the selection of a single pseudorange vector, said single pseudorange vector is used to determine an updated location uncertainty area within the initial location uncertainty area and said step of determining said location is performed using said updated location uncertainty area.

17. A method according to claim 1, wherein admissible relative pseudoranges satisfy $$\delta\rho_i - \Delta_i \leq \rho_i^* - \rho_1^* \leq \delta\rho_i + \Delta_i, \text{ wherein}$$

$\rho_i^* - \rho_1^*$ is the relative pseudorange formed by a pseudorange $\rho_i^*$ associated with satellite i and said first pseudorange $\rho_1^*$ associated with said first satellite, $\delta\rho_i$ is the mean value of the maximum and minimum differences between the range to satellite i and the range to the first satellite found at any point within the initial location uncertainty area, $\Delta_i$ is half the difference between the maximum and minimum differences between the range to satellite i and the range to the first satellite found at any point within the initial location uncertainty area.

18. A method according to claim 1, wherein said first admissible pseudorange associated with said first satellite satisfy $\rho_1^* = \text{round}((\rho_1' - v_1)/R)R + v_1$, wherein $\rho_1^*$ is said first pseudorange associated with said first satellite, $\rho_1'$ is a predicted pseudorange to said first satellite, R is a truncation interval applied for measurements on ranging signals from said first satellite expressed as a range and $v_1$ is a measured truncated pseudorange to said first satellite.

19. An apparatus for determining a location at which ranging signals from at least three satellites have been received, wherein results from timing measurements performed on said ranging signals include truncated timing measurement results for at least one of said satellites, and wherein said location is known to be located within an initial location uncertainty area, said apparatus including digital data processing circuitry adapted to:
   perform at least one pseudorange selection cycle;
   determine said location utilizing pseudoranges selected after performing said at least one pseudorange selection cycle,
   wherein said at least one pseudorange selection cycle includes an initial selection cycle,
   and wherein said digital processing circuitry is adapted to perform said initial selection cycle by:
      determinining a first pseudorange which with respect to said initial location uncertainty area is an admissible pseudorange associated with a first satellite;
      determining all pseudoranges associated with at least two additional satellites which combined with said first pseudorange form admissible relative pseudoranges;
      forming a set of pseudorange vectors representing all possible combinations of said determined pseudoranges associated with said first and at least two additional satellites;
      forming a set of selected pseudorange vectors by selecting at least one vector from said set of pseudorange vectors
      wherein at least when said set of pseudorange vectors includes plural vectors, said selecting includes evaluating each vector in said set of pseudorange vectors according to a predetermined rule for initial vector selection.

20. An apparatus according to claim 19, wherein said data processing circuitry is adapted to evaluate each vector according to said predetermined rule for initial vector selection only when said set of pseudorange vectors includes plural vectors.

21. An apparatus according to claim 19, wherein said data processing circuitry is adapted to evaluate each vector according to said predetermined rule for initial vector selection also when said set of pseudorange vectors includes a single vector.

22. An apparatus according to claim 19, wherein evaluation according to said predetermined rule for initial vector selection includes comparing locations associated with said vectors in said set of pseudorange vectors and the initial location uncertainty area.

23. An apparatus according to claim 19, wherein when said at least two additional satellites includes more than two additional satellites, evaluation according to said predetermined rule for initial vector selection includes calculating a minimum loss function value for each vector in said set of pseudorange vectors.

24. An apparatus according to claim 23, wherein vectors associated with minimum loss function values below a predefined threshold value are selected for inclusion in said set of selected pseudorange vectors.

25. An apparatus according to claim 23, wherein the vector associated with the least minimum loss function value is selected for inclusion in said set of selected pseudorange vectors.

26. An apparatus according to claim 19, wherein said at least one pseudorange selection cycle includes at least one additional selection cycle, and wherein said digital data processing circuitry is adapted to perform said at least one additional selection cycle by:
   determining all pseudoranges associated with at least one additional satellite which combined with said first pseudorange form admissible relative pseudoranges;
   forming a new set of pseudorange vectors representing all possible combinations of pseudorange vectors selected in the previous selection cycle and said determined pseudoranges associated with said at least one additional satellite;
   forming a new set of selected pseudorange vectors by selecting at least one vector from said new set of pseudorange vectors,
   wherein at least when said new set of pseudorange vectors includes plural vectors, said selecting includes evaluating each vector in said new set of pseudorange vectors according to a predetermined rule for subsequent vector selection.

27. An apparatus according to claim 26, wherein said data processing circuitry is adapted to evaluate each vector according to said predetermined rule for subsequent vector selection only when said new set of pseudorange vectors includes plural vectors.

28. An apparatus according to claim 26, wherein said data processing circuitry is adapted to evaluate each vector according to said predetermined rule for subsequent vector selection also when said new set of pseudorange vectors includes a single vector.

29. An apparatus according to claim 26, wherein evaluation according to said predetermined rule for subsequent vector selection includes comparing locations associated with said vectors in said new set of pseudorange vectors and the initial location uncertainty area.

30. An apparatus according to claim 26, wherein evaluation according to said, predetermined rule for initial vector selection includes calculating a minimum loss function value for each vector in said new set of pseudorange vectors.

31. An apparatus according to claim 30, wherein vectors associated with minimum loss function values below a predefined threshold value are selected for inclusion in said new set of selected pseudorange vectors.

32. An apparatus according to claim 30, wherein the vector associated with the least minimum loss function value is selected for inclusion in said new set of selected pseudorange vectors.

33. A computer program embodied on a computer-readable medium and executable by digital data processing circuitry to perform a method according to claim 1.

* * * * *